(12) United States Patent
Bronniman (10) Patent No.: US 10,276,028 B2
(45) Date of Patent: Apr. 30, 2019

(54) EYEGLASS TRACKING SYSTEM AND METHOD

(71) Applicant: Matthew Bronniman, Parker, CO (US)

(72) Inventor: Matthew Bronniman, Parker, CO (US)

( * ) Notice: Subject to any disclaimer, the term of this patent is extended or adjusted under 35 U.S.C. 154(b) by 0 days.

(21) Appl. No.: 15/933,096

(22) Filed: Mar. 22, 2018

(65) Prior Publication Data

US 2018/0218589 A1 Aug. 2, 2018

Related U.S. Application Data

(63) Continuation-in-part of application No. 15/438,752, filed on Feb. 21, 2017, now abandoned.

(60) Provisional application No. 62/414,315, filed on Oct. 28, 2016.

(51) Int. Cl.
*H04W 24/00* (2009.01)
*G08B 21/24* (2006.01)
*G02C 11/00* (2006.01)

(52) U.S. Cl.
CPC ............. *G08B 21/24* (2013.01); *G02C 11/10* (2013.01)

(58) Field of Classification Search
CPC ... H04W 64/006; H04W 4/023; H04W 4/028; H04W 4/20; G01S 1/725; G01S 13/82; G01S 1/68; G08B 21/24; G02C 11/00; G02C 11/10; G02C 9/02; G02B 27/017; G02B 27/0093; G02B 2027/0138; G02B 2027/014; G02B 2027/0187; G02B 2027/0116; G06F 3/013
USPC .............. 455/457, 456.1, 456.3; 340/539.32, 340/539.11, 572.1, 539.13, 539.12, 340/539.15, 539.22, 539.23; 351/158, 351/141
See application file for complete search history.

(56) References Cited

U.S. PATENT DOCUMENTS

| | | | | |
|---|---|---|---|---|
| 8,430,507 B2 * | 4/2013 | Howell | .................. | G02C 11/10 351/158 |
| 8,473,004 B2 * | 6/2013 | Warren | .................. | A42B 1/245 351/158 |
| 8,500,271 B2 * | 8/2013 | Howell | .................. | G02C 5/001 351/158 |
| 8,531,355 B2 * | 9/2013 | Maltz | ...................... | H04W 4/20 345/8 |
| 8,810,392 B1 * | 8/2014 | Teller | ...................... | G08B 21/24 235/385 |
| 8,847,754 B2 * | 9/2014 | Buchheim | ................. | G01S 1/68 340/539.13 |
| 9,153,074 B2 * | 10/2015 | Zhou | ........................ | G06F 1/163 |
| 9,864,211 B2 * | 1/2018 | Belbey | ...................... | G02C 7/02 |
| 2005/0285739 A1 * | 12/2005 | Velhal | ................ | G08B 21/0227 340/572.1 |

(Continued)

FOREIGN PATENT DOCUMENTS

WO WO-2008076774 A2 * 6/2008 ........... A61B 5/1112
WO WO-2013019893 A1 * 2/2013 ............... G02C 9/04

*Primary Examiner* — Mahendra Patel (74) *Attorney, Agent, or Firm* — Integrity Patent Group, PLC; Charles E. Runyan (57) ABSTRACT

An eyeglass tracking system includes an eyeglass assembly having a transceiver configured to transmit a signal to an electronic communication device having a software application for locating the eyeglass assembly. The electronics communication device may indicate a geographic location or a proximity to the eyeglass assembly when the software application is initiated. The eyeglass tracking system is useful for locating misplaced eyeglasses.

20 Claims, 5 Drawing Sheets

(56) References Cited

U.S. PATENT DOCUMENTS

| | | | | |
|---|---|---|---|---|
| 2007/0008484 A1* | 1/2007 | Jannard | ............... | G02C 3/003 351/41 |
| 2008/0068559 A1* | 3/2008 | Howell | ............... | G01C 22/006 351/158 |
| 2011/0130112 A1* | 6/2011 | Saigh | ............... | H04M 1/7253 455/404.1 |
| 2013/0208234 A1* | 8/2013 | Lewis | ............... | G06F 3/011 351/158 |
| 2013/0250232 A1* | 9/2013 | Belbey | ............... | G02C 7/02 351/158 |
| 2013/0342805 A1* | 12/2013 | Huang | ............... | G02C 9/02 351/158 |
| 2013/0346168 A1* | 12/2013 | Zhou | ............... | G06F 1/163 705/14.4 |
| 2015/0170418 A1* | 6/2015 | Flynn | ............... | G06F 3/04815 345/633 |
| 2015/0170504 A1* | 6/2015 | Jooste | ............... | A61B 5/6898 340/539.12 |
| 2015/0230072 A1* | 8/2015 | Saigh | ............... | H04W 4/90 455/404.1 |
| 2016/0110975 A1* | 4/2016 | Oppenheimer | ......... | G06F 21/50 340/572.1 |

* cited by examiner

EYEGLASS TRACKING SYSTEM AND METHOD

CROSS-REFERENCE TO RELATED APPLICATION

The present application is a continuation in part and is related to and claims priority to U.S. Provisional Patent Application No. 62/414,315 filed Oct. 28, 2016, and pending U.S. Non-Provisional patent application Ser. No. 15/438,752 filed Feb. 21, 2017, and which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of eyeglasses of existing art and more specifically relates to electronic eyeglass systems.

2. Description of Related Art

Many people wear eyeglasses in order to see properly if their eyesight is poor. Eyeglasses are devices consisting of lenses which are mounted in a frame and worn on the bridge of the nose so that the lenses are placed in front of a viewer's eyes. The eyeglass lenses bend the rays of light which pass through in order to focus a user's vision. Due to the compact size of most eyeglasses, it is extremely common for them to become lost or misplaced. When glasses are missing for a short time, a user may be unable to perform important activities such as driving or reading. In some instances, eyeglasses are lost and must be replaced. An effective solution is desired.

U.S. Pat. No. 8,810,392 to Eric Teller et al. relates to a device and method for monitoring the presence of items and issuing an alert if an item is not detected. The described device includes methods and systems that involve monitoring presence of items based on context. The methods include determining a proximity framework between a monitoring device and one or more items based on context of a given user.

BRIEF SUMMARY OF THE INVENTION

In view of the foregoing disadvantages inherent in the known eyeglass art, the present disclosure provides a novel eyeglass tracking system and method. The general purpose of the present disclosure, which will be described subsequently in greater detail, is to provide an eyeglass tracking system and method.

The present invention provides a pair of eyeglasses with an embedded location transmitter that communicates with a mobile device application. This alerts the user of the location of their eyeglasses or sunglasses to prevent lost or stolen eye wear. It ensures that an individual has their eyeglasses when needed and eliminates the need to replace lost or stolen glasses. It offers a tracking system that continuously stores tracking information for the item. The present invention notifies users of the location of their glasses on demand or when the glasses are a predetermined distance away from the individual.

An eyeglass tracking system is disclosed herein. The eyeglass tracking system comprises an eyeglass assembly having an eyeglass frame preferably comprising Ultem plastic for flexibility and electric resistance (which enables the ZigBee powered microchip or other to send an rx at greater distances, resulting in better connections and more accurate and precise information), and a first concealed low-power, low-duty low data-rate IEEE 802.15.4/ZigBee transceiver which is concealably-attached to the eyeglass frame and that is configured to transmit a wireless signal, a mobile communication device comprising a processor executing instructions retrieved from a memory, a second low-power, low-duty low data-rate IEEE 802.15.4/ZigBee transceiver configured to receive the wireless signal, and a display device, and the first concealed low-power, low-duty low data-rate IEEE 802.15.4/ZigBee transceiver. Other suitable microchips, transceivers and the like may be used. When executed the instructions control the processor to process the wireless signal transmitted/received by a first concealed low-power, low-duty low data-rate IEEE 802.15.4/ZigBee/second low-power, low-duty low data-rate IEEE 802.15.4/ZigBee transceiver, to create a navigational display on the display device, and to cause electronic information determined from the wireless signal by the processor to indicate a geographic location of the eyeglass assembly on the navigational display.

The first concealed low-power, low-duty low data-rate IEEE 802.15.4/ZigBee transceiver is integrated into and concealed by the eyeglass frame; the eyeglass frame comprising a protective housing. The first concealed low-power, low-duty low data-rate IEEE 802.15.4/ZigBee transceiver further comprises a power source and an antenna, which continuously transmit electronic information indicative of the transceiver's geographic location. In various embodiments, the electronic location information determined from the wireless signal by the processor indicates a relative or absolute geographic location on the navigational display. The electronic communication device comprises a sound generating device. The electronic location information determined from the wireless signal controls the sound generating device to produce a sound having one of a volume and frequency that varies with a distance between the eyeglass frame and the electronic communication device.

The mobile wireless communications device is wirelessly coupled to the first concealed low-power, low-duty low data-rate IEEE 802.15.4//ZigBee transceiver of the eyeglass assembly. The processor is configured to receive a signal from the second low-power, low-duty low data-rate IEEE 802.15.4//ZigBee transceiver, the signal indicating a direction toward the eyeglass assembly relative to the mobile wireless communications device. The eyeglass tracking system further includes a graphical user interface generated by the instructions of the software application, the graphical user interface instructing a user in the direction that indicates the location of the eyeglass assembly.

The assembly may include a bridge fixedly connecting two lenses, two temples each with a temple tip, each temple coupled to one of the two lenses at a proximate end away from the temple tip, two nose pads each with a nose pad arm, each nose pad coupled to one of the two lenses below the bridge by its nose pad arm, an integrated circuit fixedly attached to the eyeglass frame that is configured to transmit and receive electronic information via a wireless signal, and an antenna operably coupled to the transceiver.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, an eyeglass tracking system and method, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to wireless communication device navigation systems and more particularly to an eyeglass tracking system and method as used to improve the locating of misplaced eyeglasses.

Generally speaking, the eyeglass tracking system provides a tracking system for a pair of eyeglasses. The system is comprised of an embedded location transmitter that may be placed anywhere within the eyeglass frame, such as in the nose frame. The eyeglass frame is preferably an amorphous, amber-to-transparent thermoplastic. The material of the eyeglass frame allows the ZigBee powered microchip to send and rx at greater distances, resulting in better connections and more accurate and precise information. The transmitter works in tandem with a mobile computing device application that allows the user to see the location of the glasses on demand. The glasses may also send an alert (audible or otherwise) to the mobile device when the user is a preset distance apart from their glasses. The application and transmitter may communicate by way of an IEEE 802.15 standard network, GPS, or other technology. The mobile computing device is able to continuously store tracking information. This concept may also be applied to sunglass frames. In certain embodiments, the transmitter may be removably sealed within a pair of glasses. The transmitter may be removed and applied to another set of glasses in a sealed condition.

Figure 1:
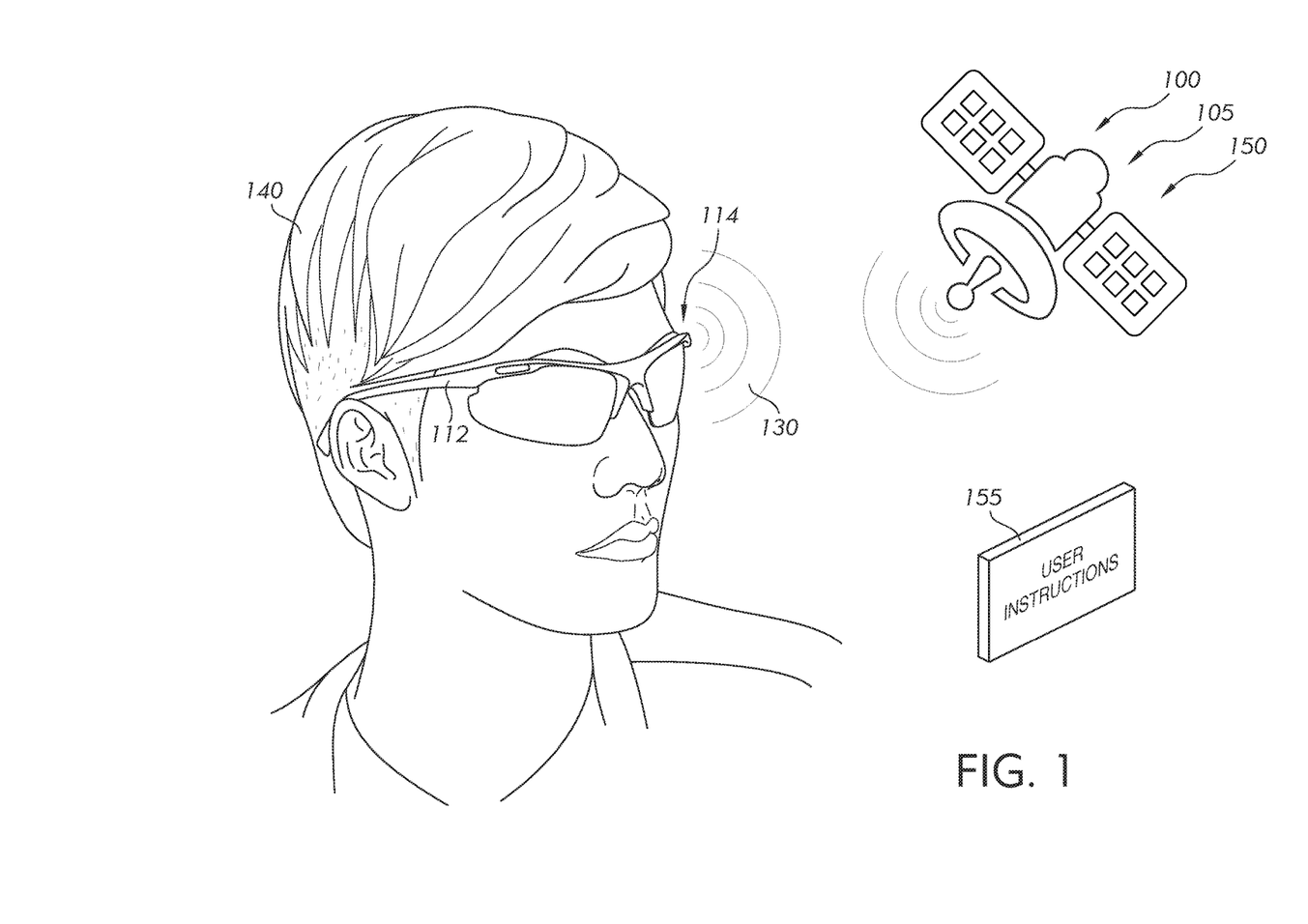
FIG. 1 is a perspective view of the eyeglass tracking system during an 'in-use' condition, according to an embodiment of the disclosure.

Referring now more specifically to the drawings by numerals of reference, there is shown in FIGS. 1-4, various views of an eyeglass tracking system 100. FIG. 1 shows an eyeglass tracking system during an 'in-use' condition 150, according to an embodiment of the present disclosure. Here, the eyeglass tracking system 100 may be beneficial for use by a user 140 to locate missing eyeglasses. As illustrated, the eyeglass tracking system 100 may include an eyeglass frame 112 a first concealed low-power, low-duty low data-rate IEEE 802.15.4/ZigBee transceiver 114 concealedly-attached to the eyeglass frame 112 and configured to transmit a wireless signal 130, and a mobile communication device 120 comprising a processor 122 executing instructions retrieved from a memory, a second low-power, low-duty low data-rate IEEE 802.15.4/ZigBee transceiver 123 configured to receive the wireless signal 130, and a display device 124.

The first concealed low-power, low-duty low data-rate IEEE 802.15.4/ZigBee transceiver 114 is configured to transmit the wireless signal 130 autonomously for months without recharging. When executed the instructions control the processor 122 to process the wireless signal 130 transmitted/received by the first concealed low-power, low-duty low data-rate IEEE 802.15.4/ZigBee transceiver 114 and second low-power, low-duty low data-rate IEEE 802.15.4/ZigBee transceiver 123, to create a navigational display on the display device 124, and to cause electronic information determined from the wireless signal 130 by the processor 122 to indicate a geographic location of the eyeglass assembly 110 on the navigational display.

Figure 2:
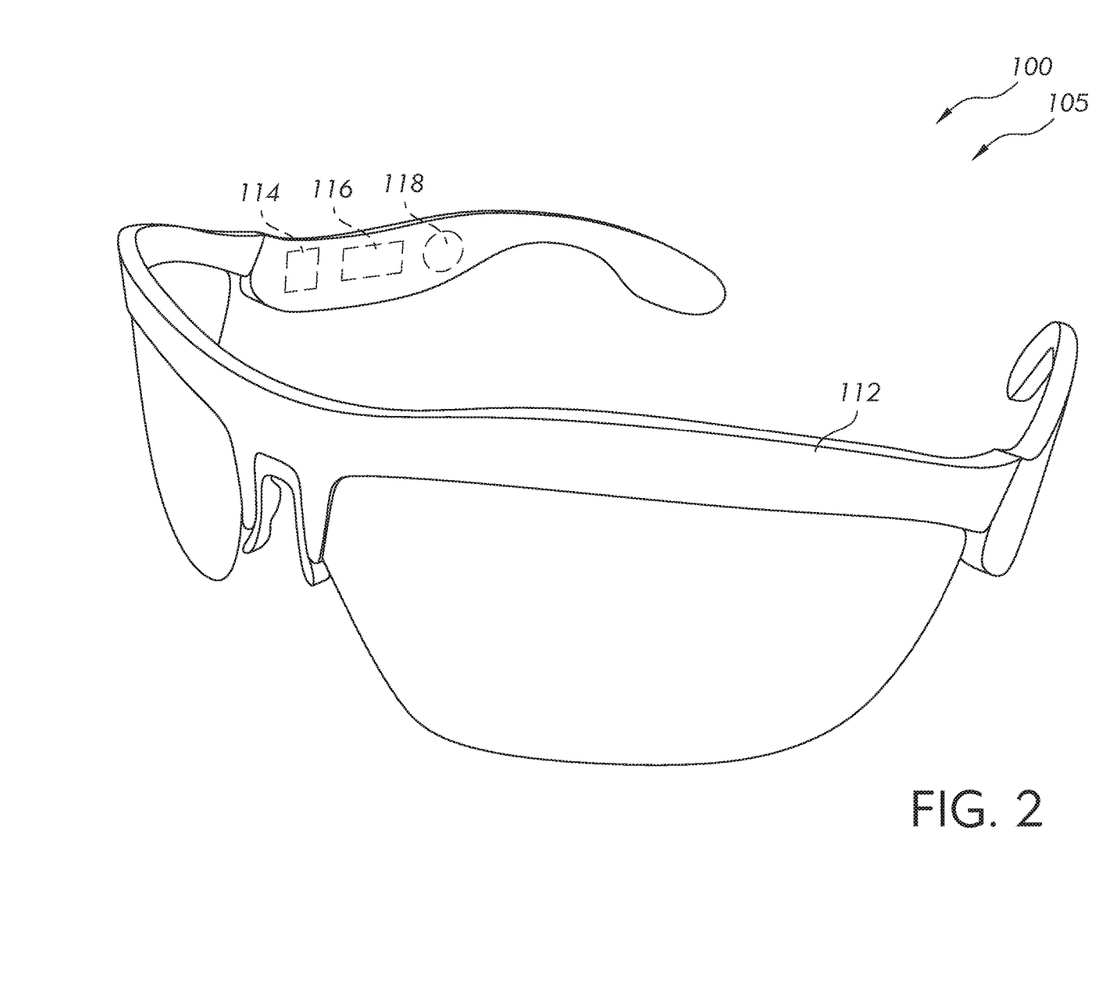
FIG. 2 is a perspective view of the eyeglass assembly of FIG. 1, according to an embodiment of the present disclosure.
Figure 3:
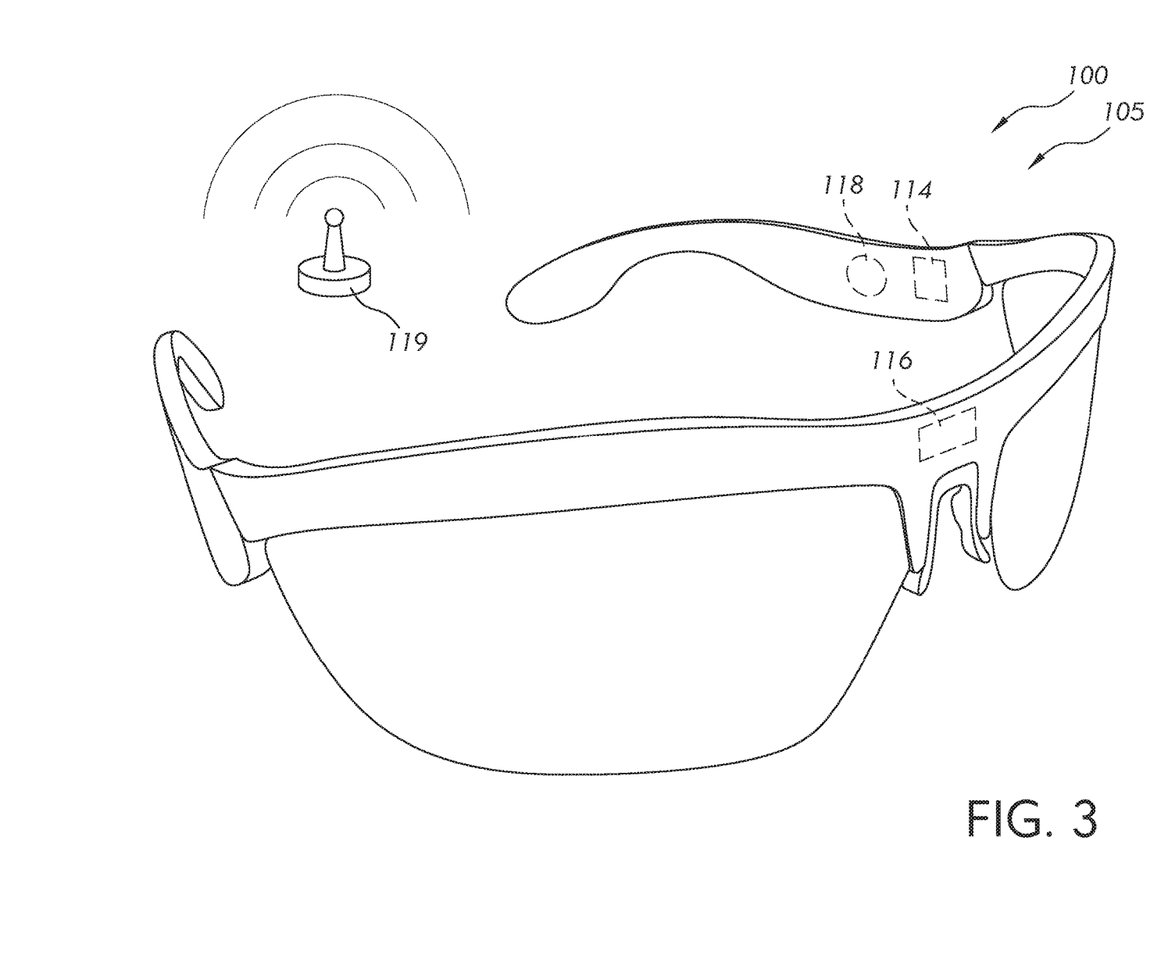
FIG. 3 is a perspective view of the eyeglass assembly of FIG. 1, according to an embodiment of the present disclosure.

FIG. 2 and FIG. 3 show the eyeglass tracking system of FIG. 1, according to an embodiment of the present disclosure. As above, the eyeglass tracking system 100 may include an eyeglass assembly 110. The first concealed low-power, low-duty low data-rate IEEE 802.15.4/ZigBee transceiver 114 is integrated into and concealed by the eyeglass frame 112, the eyeglass frame comprising a protective housing. The first concealed low-power, low-duty low data-rate IEEE 802.15.4/ZigBee transceiver 114 further comprises a power source 118 and an antenna 119. The first concealed low-power, low-duty low data-rate IEEE 802.15.4/ZigBee transceiver 114 continuously transmits electronic location information indicative of geographic location of the eyeglass assembly 110. The electronic location information determined from the wireless signal 130 by the processor 122 indicates a relative geographic location on the navigational display. The electronic location_information determined from the wireless signal 130 by the processor 122 indicates an absolute or relative geographic location on the navigational display.

Figure 4:
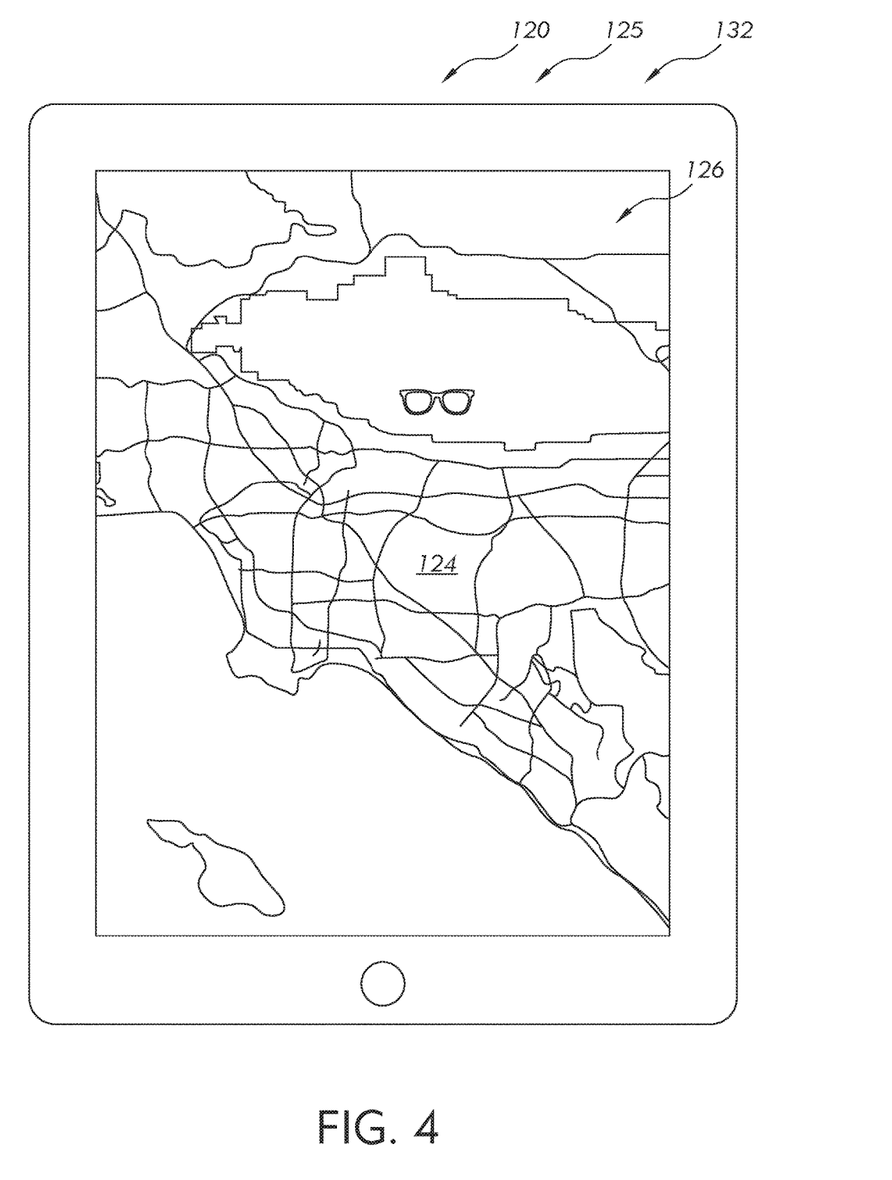
FIG. 4 is a perspective view of the mobile communications device of FIG. 1, according to an embodiment of the present disclosure.

FIG. 4 is a frontal view of the eyeglass tracking system of FIG. 1, according to an embodiment of the present disclosure. The eyeglass tracking system 100 further comprises a graphical user interface 126 generated by the instructions 155 of the software application 132; the graphical user interface 126 instructing a user 140 in the direction that indicates the location of the eyeglass assembly 110. The eyeglass assembly 110 may include a global positioning system transceiver, a radio frequency identification tag transponder, a BLUETOOTH transceiver, a ZigBee transceiver, or an ultra-wideband transceiver.

The electronic communication device 120 comprises a sound generating device 125. The electronic location information determined from the wireless signal 130 controls the sound generating device 125 to produce a sound having a volume and frequency that varies with a distance between the eyeglass frame 112 and the electronic communication device 120. The mobile wireless communications device 120 is wirelessly coupled to the first concealed low-power, low-duty low data-rate IEEE 802.15.4//ZigBee transceiver 114 of the eyeglass assembly 110. The processor 122 is configured to receive a signal from the second low-power, low-duty low data-rate IEEE 802.15.4//ZigBee transceiver 123. The signal indicates a direction toward the eyeglass assembly 110 relative to the mobile wireless communications device 120.

The eyeglass assembly 110 may also include an IEEE network standard 802.15 transceiver, an IEEE network standard 802.15.4 transceiver, an IEEE network standard 802.15.4a transceiver, an IEEE network standard 802.11 transceiver, and/or an IEEE network standard 802.16 transceiver further comprising a battery electrically connected to the transceiver. The eyeglass assembly 110 may be configured to stay charged for longer periods of time and use less power in comparison to traditional BLUETOOTH technology which is desirable.

According to one embodiment, the eyeglass tracking system 100 may be arranged as a kit 105. In particular, the eyeglass tracking system 100 may further include a set of instructions 155. The instructions 155 may detail functional relationships in relation to the structure of the eyeglass tracking system 100 (such that the eyeglass tracking system 100 can be used, maintained, or the like, in a preferred manner).

Figure 5:
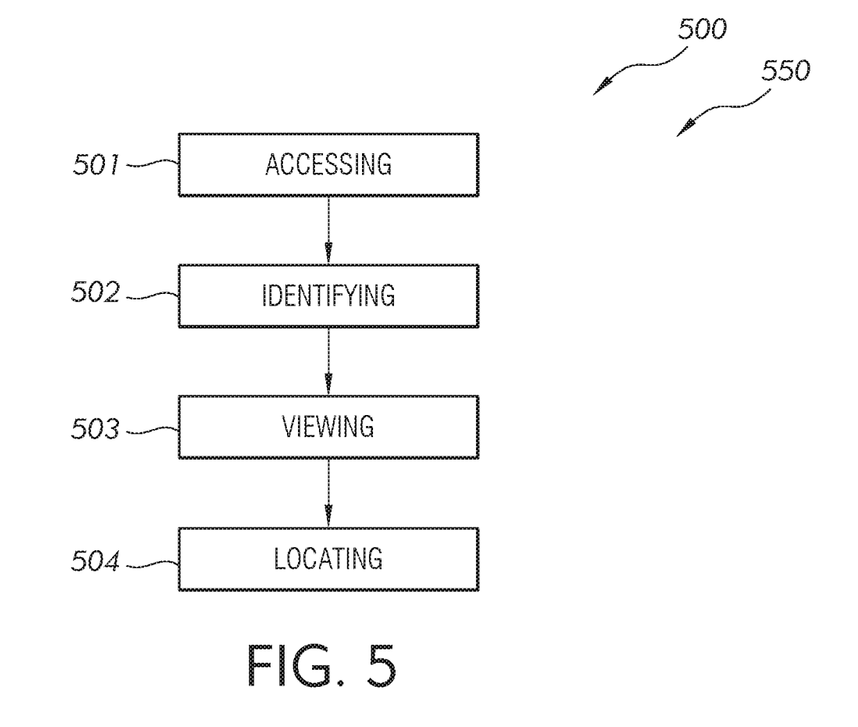
FIG. 5 is a flow diagram illustrating a method of use for locating eyeglasses, according to an embodiment of the present disclosure.

FIG. 5 is a flow diagram illustrating a method for locating eyeglasses, according to an embodiment of the present disclosure. In particular, the method for locating eyeglasses 500 may include one or more components or features of the eyeglass tracking system 100 as described above. As illustrated, the method for locating eyeglasses 500 may include the steps of: step one 501, accessing a software application installed on a mobile wireless communications device; step two 502, identifying and selecting an eyeglass assembly to be located using a graphical user interface created by said software application; step three 503, viewing a navigational display using said graphical user interface displaying a direction or location of said eyeglass assembly; and step four 504, locating said eyeglass assembly by following one of a sound, a direction indicator, and a displayed location provided by graphical user interface that is generated by said software application.

It should be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for locating eyeglasses (e.g., different step orders within above-mentioned list, elimination or addition of certain steps, including or excluding certain maintenance steps, etc.), are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An eyeglass tracking system comprising:
   an eyeglass assembly having
     an eyeglass frame; and
     a first, concealed, low-power, low-duty, low-data-rate, IEEE standard compliant transceiver that is concealedly attached to said eyeglass frame and that is configured to transmit a wireless signal containing eyeglass assembly location data; and
   a mobile communication device comprising:
     a processor executing instructions retrieved from a memory;
     a second, low-power, low-duty, low-data-rate, IEEE standard compliant transceiver that is configured to receive said wireless signal;
     a speaker and a display device,
   wherein said first transceiver is configured to transmit said wireless signal autonomously for one or more months without recharging;
   wherein when executed said instructions control said processor to process said wireless signal received by said first transceiver to display on said display device a geographic location of said eyeglass assembly; and
   wherein when executed said instructions control said processor to process said wireless signal to emit on said speaker a sound having one of a volume or frequency that varies with a distance between said eyeglass frame and said electronic communication device.

2. The eyeglass tracking system of claim 1, wherein said first transceiver is integrated into and concealed by said eyeglass frame, said eyeglass frame comprising a protective housing.

3. The eyeglass tracking system of claim 1, wherein said first transceiver further comprises a power source and an antenna.

4. The eyeglass tracking system of claim 1, wherein said first transceiver continuously transmits electronic location information indicative of the geographic location of said eyeglass assembly.

5. The eyeglass tracking system of claim 1, wherein said electronic location information determined from said wireless signal by said processor indicates a relative geographic location on said navigational display.

6. The eyeglass tracking system of claim 1, wherein said electronic location information determined from said wireless signal by said processor indicates an absolute geographic location on said navigational display.

7. The eyeglass tracking system of claim 1, wherein said electronic communication device comprises a sound generating device.

8. The eyeglass tracking system of claim 1, wherein said electronic location information determined from said wireless signal controls said sound generating device to produce a sound having one of a volume and frequency that varies with a distance between said eyeglass frame and said electronic communication device.

9. The eyeglass tracking system of claim 1, wherein said mobile wireless communications device is wirelessly coupled to said first transceiver of said eyeglass assembly.

10. The eyeglass tracking system of claim 1, wherein said processor is configured to receive a signal from said second transceiver, the signal indicating a direction toward said eyeglass assembly relative to said mobile wireless communications device.

11. The eyeglass tracking system of claim 1, further comprising a graphical user interface generated by said mobile communications device executing instructions, the graphical user interface displaying a direction that indicates the location of said eyeglass assembly.

12. The eyeglass tracking system of claim 1, wherein said first transceiver of said eyeglass assembly also comprises a global positioning system transceiver.

13. The eyeglass tracking system of claim 1, wherein said first transceiver of said eyeglass assembly also comprises an IEEE network standard 802.15 transceiver.

14. The eyeglass tracking system of claim 1, wherein said first transceiver of said eyeglass assembly also comprises an IEEE network standard 802.15.4 transceiver.

15. The eyeglass tracking system of claim 1, wherein said first transceiver of said eyeglass assembly also comprises an IEEE network standard 802.15.4a transceiver.

16. The eyeglass tracking system of claim 1, wherein said first transceiver of said eyeglass assembly also comprises an IEEE network standard 802.11 transceiver.

17. The eyeglass tracking system of claim 1, wherein said first transceiver of said eyeglass assembly also comprises an IEEE network standard 802.16 transceiver further comprising a battery electrically connected to the transceiver.

18. The eyeglass tracking system of claim 1, wherein said first transceiver of said eyeglass assembly also comprises a radio frequency identification tag transponder.

19. A method of locating a set of eyeglasses with the eyeglass tracking system of claim 1, the method comprising the steps of:
   accessing a software application installed on a mobile wireless communications device;
   identifying and selecting an eyeglass assembly to be located using a graphical user interface created by said software application;
   viewing a navigational display using said graphical user interface displaying a direction or location of said eyeglass assembly; and
   locating said eyeglass assembly by following one of a sound, a direction indicator, and a displayed location provided by said graphical user interface that is generated by said processor executing instructions received from the memory.

20. The eyeglass tracking system of claim 1, further comprising an eyeglass assembly having:
   an eyeglass frame including
      a bridge fixedly connecting two lenses,
      two temples each with a temple tip, each temple coupled to one of the two lenses at a proximate end away from the temple tip,
      two nose pads each with a nose pad arm, each nose pad coupled to one of the two lenses below the bridge by its nose pad arm;
   an integrated circuit fixedly attached to the eyeglass frame that is configured to transmit and receive electronic information via a wireless signal; and
   an antenna operably coupled to the transceiver.

* * * * *